Figure 1:
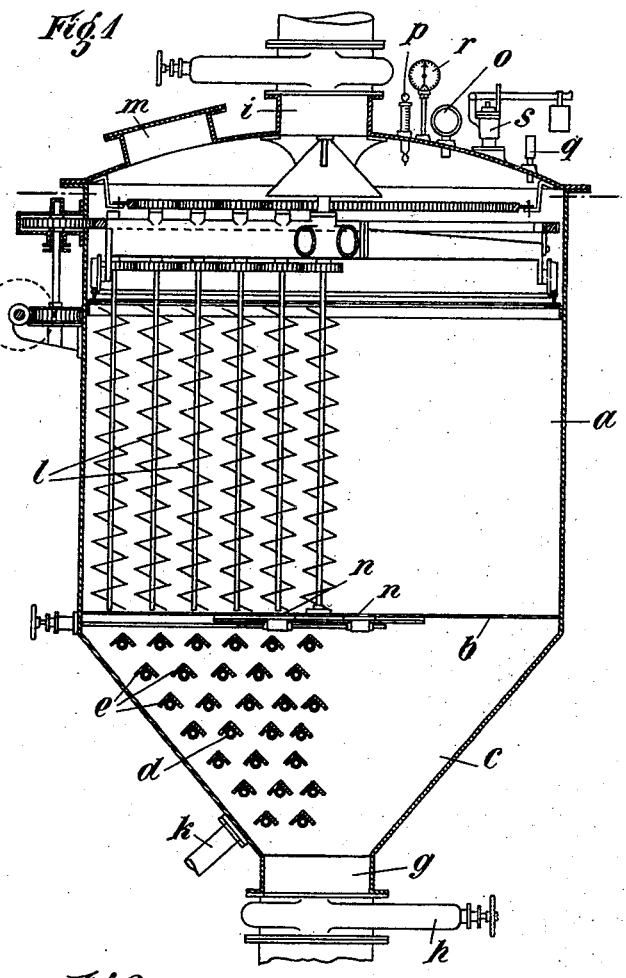

No. 690,592. Patented Jan. 7, 1902.
V. LAPP.
PROCESS OF DRYING GRAIN.
(Application filed May 15, 1901.)
(No Model.)

Witnesses:
E. Hoffman
C. Hanusch

Inventor:
Valentin Lapp
by B. Singer
atty.

UNITED STATES PATENT OFFICE.

VALENTIN LAPP, OF LINDEHAU, NEAR LEIPSIC, GERMANY.

PROCESS OF DRYING GRAIN.

SPECIFICATION forming part of Letters Patent No. 690,592, dated January 7, 1902.

Application filed May 15, 1901. Serial No. 60,358. (No specimens.)

*To all whom it may concern:*

Be it known that I, VALENTIN LAPP, brewer, a subject of the King of Saxony, residing at Lindehau, near Leipsic, in the Kingdom of Saxony, in the German Empire, have invented a new and useful Process of Drying, Kiln-Drying, and Torrefying Grain, of which the following is a specification.

This invention relates to a process of drying, kiln-drying, and torrefying germinated as well as non-germinated grain; and it consists in subjecting the grain alternately to the action of air or air-pressure and a vacuum, the object of this process being to dehydrate great quantities of grain at a time and in a shorter time than was possible hitherto and to dry, kiln-dry, and torrefy that grain in a manner allowing of an accurate regulation.

Up to now only comparatively small quantities of grain, forming only thin layers, could be dried, kiln-dried, and torrefied at a time. This time, however, was long if the malt was to be good and not hard, and to this end it was necessary to treat the grain in several apparatus and to transport it from one apparatus to the other.

The present improved process differs from the known processes of dehydrating grain in that the grain is subjected not only to the action of a vacuum, but alternately to the action of such a one and of air or air-pressure. The employment of solely a vacuum has not proved successful, because the air is too quickly removed from or sucked out of the grain, so that the water, being not so fluid and mobile and evaporating but slowly, remains inside and upon the grain, which is thus turned in a rather compact mass. Owing thereto the dehydration of the grain is only the more impeded, and quickly drying and torrefying the grain is rendered impossible.

According to my improved method the grain is piled up in layers that are from eight to ten times thicker than hitherto in a closed vessel, the interior of which may be made void of air or exhausted by any suitable means and may be heated by means of heating-pipes, heating-chambers, or the like. By aid of this apparatus the process is carried out as follows: After the grain has been introduced into the aforementioned vessel this latter is closed and the air therein contained is exhausted, so as to create a vacuum. This is maintained for about one hour without any heating, so that the air contained within the grain, as well as a part of the water, are removed. Thereafter the vacuum is quickly replaced by an abundant supply of fresh air or by air under pressure, that air being preferably introduced from below, so as to cause the grain to be somewhat lifted and loosened. The grain that, as just stated, is already freed from the air formerly inclosed by it is now kept under air-pressure for some time, so that it again takes up air. By this means the ways or channels in the grains through which the evaporating water escapes are kept open, and owing thereto the grain is prevented from forming a compact mass and the removal of the water is greatly promoted. The grains are, so to say, "puffed up" with air and all pores of them are filled with the same. The thus-treated grain is then heated, preferably to about from 25° to 30° centigrade, whereby a strong sweating of the grain is caused. The removal of the water proceeds now quickly, but no shriveling or shrinking or the like of the grain occurs. When thus about one-half of the water originally contained in the grain has been removed, also the remaining water is gradually removed, while the temperature is increased, and the grain or malt is then torrefied with such contents of water as just desired for the particular kind of malt. These contents of water, as well as the contents of water in the preceding phases of the process, may easily be regulated according to any requirement, because the water may be removed from the malt solely by a greater or lesser supply of air without any further heating. The supply of air may be repeated as often and in such intervals as corresponds best to the kind of malt to be produced.

The process requires only about one-fifth or one-sixth of the time that was necessary heretofore for drying, kiln-drying, and torrefying the grain, and it offers the further advantage that it can be carried through in only one apparatus and that the large malt-kiln buildings are entirely dispensed with. The apparatus may be located upon the plain ground or surface or even at a place below the surface or at any other place, and as the heating need be but slight a great saving in fuel is obtained.

In carrying my improved process into practice I make use of the apparatus represented in the accompanying drawings, in which similar letters denote similar parts throughout both views, and in which—

Figure 2:
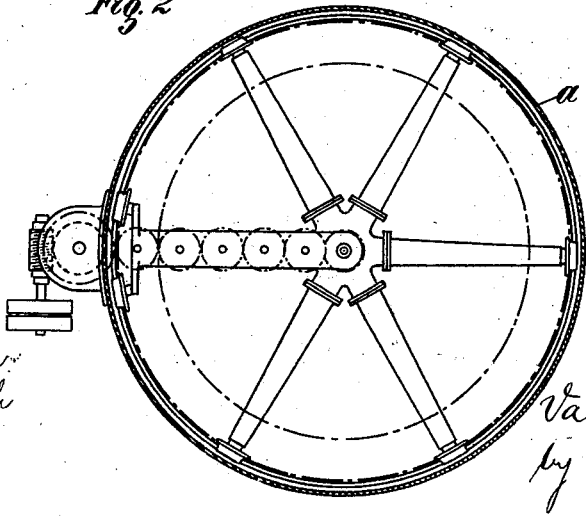

Figure 1 is a vertical section through the apparatus, and Fig. 2 is a horizontal section through the same.

The apparatus consists of a vessel $a$, preferably of cylindrical section, having a perforated bottom (sieve-bottom) $b$, which supports the grain to be treated. Below said bottom the vessel $a$ forms a funnel-like space or chamber $c$, containing heating-pipes $d$, the latter being preferably such as employed in radiators and the like. Protective shields or roofs $e$ may be arranged above said pipes. The arrangement of the heating-pipes and their relative position to each other is preferably such that the malt can pass through the interstices between them after the treatment of the malt has been finished. To allow the malt to escape, the sieve-bottom $b$ is provided with larger apertures $n$, which may be closed by slides or the like. Also the space or chamber $c$ has an outlet-tube $g$, that may be closed by a slide $h$ or the like.

Inside the vessel $a$ are turning and stirring blades $l$ or the like for loosening the grain. The air enters the vessel through a pipe $k$ and leaves it through a piece of tube $i$, which may be closed by means of a slide, and the grain passes into the vessel through a manhole $m$, which is provided in the cover or lid of the vessel and affords also an entrance into the interior of the same. The vessel $a$ is finally provided also with a thermometer $p$, a vacuum-gage $o$, a manometer $r$, a hygrometer $q$, and a safety-valve $s$.

Having now described my invention, what I desire to secure by a patent of the United States is—

1. The method of drying, kiln-drying and torrefying germinated and ungerminated grain, consisting in depriving the grain of air and part of the water without any heating by means of a vacuum in a closed space, leading again air into said space and to said grain, removing quickly about a half of the remaining water by the application of a moderate degree of heat, removing gradually another part of the remaining water in definitive and adjustable quantities, and torrefying the thus-treated grain, substantially as described.

2. The method of drying, kiln-drying and torrefying germinated and ungerminated grain, consisting in depriving the grain of air and part of the water without any heating by means of a vacuum in a closed space, leading again compressed air into said space and to said grain, removing quickly about a half of the remaining water by the application of a moderate degree of heat, removing gradually another part of the remaining water in definitive and adjustable quantities, and torrefying the thus-treated grain, substantially as described.

In witness whereof I have hereunto set my hand in presence of two witnesses.

VALENTIN LAPP.

Witnesses:
OTTO NAUMANN,
RUDOLPH FRICKE.